United States Patent
Tamaki et al.

(10) Patent No.: US 6,282,498 B1
(45) Date of Patent: *Aug. 28, 2001

(54) LOAD MONITORING APPARATUS

(75) Inventors: Atsuhiko Tamaki, Kyoto; Katsuhisa Hagami, Takashima-gun, both of (JP)

(73) Assignee: Tsubakimoto Chain, Co., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,900

(22) Filed: Jun. 24, 1998

(30) Foreign Application Priority Data

Aug. 1, 1997 (JP) .................................................. 9-208091

(51) Int. Cl.⁷ .................................................. G06F 19/00
(52) U.S. Cl. .............................. 702/44; 702/33; 702/57; 700/174; 700/293
(58) Field of Search .................... 702/33, 34, 41, 702/42, 44, 57; 700/174, 204, 293, 294, 295, 296; 324/142, 779; 361/23, 30, 78–79

(56) References Cited

U.S. PATENT DOCUMENTS

| | | | |
|---|---|---|---|
| 4,101,831 | * 7/1978 | Dumbeck | 324/166 |
| 4,453,421 | * 6/1984 | Umano | 702/41 |
| 4,633,720 | * 1/1987 | Dybel et al. | 702/41 |
| 4,821,562 | * 4/1989 | Inoue | 324/76.12 |
| 5,163,011 | * 11/1992 | Gunsallus | 702/42 |
| 5,428,556 | * 6/1995 | Torizawa et al. | 702/34 |
| 5,631,851 | * 5/1997 | Tanaka et al. | 702/33 |
| 5,822,212 | * 10/1998 | Tanaka et al. | 700/174 |

FOREIGN PATENT DOCUMENTS 7-274383  10/1995  (JP) .

* cited by examiner

*Primary Examiner*—Marc S. Hoff
*Assistant Examiner*—Bryan Bui
(74) *Attorney, Agent, or Firm*—Helfgott & Karas, P.C.

(57) ABSTRACT

A load monitoring apparatus has a structure that the electric-power value of a motor is sampled in response to a sampling signal, the sampling cycle of which is changed at a predetermined recursive number. Moreover, the electric-power value is calculated in accordance with a result of the sampling is subjected to an absolute-value range and a relative-value range which is determined in accordance with the previously calculated electric-power value so as to determine an abnormal load of the motor. The sampling cycle is elongated in predetermined steps to correspond to the characteristic of, for example, a reduction gear until a stable driving state is obtained so that an abnormal state of the load such that the load is gradually increased or decreased is detected in accordance with the relative-value range before the abnormal state exceeds limits of the absolute-value range.

18 Claims, 4 Drawing Sheets ure thereof.
LOAD MONITORING APPARATUS

BACKGROUND OF THE INVENTION

The present invention relates to a load monitoring apparatus for monitoring a load of various machineries, such as machine tools, each incorporating an electric motor as a drive source thereof.

If an abnormal load is generated in a machinery, such as a machine tool or a carrying apparatus, incorporating an electric motor (hereinafter simply called a "motor") as a drive source thereof, continuous rotation of the abnormal motor will cause the motor to be burnt, the tool to be damaged and the machining efficiency to excessively be lowered. Therefore, the load of the machinery must be monitored while it is driving.

Hitherto, the electric-power value of the motor which directly corresponds to the load which is thus increase/decrease has been detected. An operation for adjusting the electric-power value of the motor to satisfy an appropriate absolute-value range has been performed so that the load has been met the appropriate absolute-value range.

When the operation for monitoring the load by detecting the electric-power value is performed to, for example, detect a fact that a cargo is slightly caught in the carrying apparatus in accordance with change in the electric-power value of the motor, the weight of the cargo is usually different in each case. Therefore, when a very light cargo is carried, the method of monitoring the load by detecting the absolute-value range of the electric-power value has a probability that an abnormal load cannot be determined even if an excessively heavy load is applied to the machinery. If the abnormal load is detected, the machinery has already been brought to a dangerous state.

Therefore, the applicant of the present invention has disclosed a load monitoring apparatus in Japanese Patent Laid-Open No. 7-274383. The load monitoring apparatus has a structure that the electric-power value supplied to the motor is monitored in accordance with upper and lower limits for defining a predetermined absolute-value range for the electric-power value. Moreover, electric-power values of the motor extracted at a predetermined sampling cycle are previously stored. The electric-power value is monitored in accordance with upper and lower limits for defining a relative-value range in which the previously extracted electric-power value is employed as a referential electric-power value. If the extracted electric-power value does not satisfy either of the absolute-value range or the relative-value range, an abnormal signal is output. Moreover, electric-power value supply to the motor is cut off. The above-mentioned load monitoring apparatus, for example, is able to monitor relative change in the load according to the change in the cargo weight.

The above-mentioned machinery has a reduction gear provided for the drive system thereof. If foreign matter is introduced into bearings which support a rotational shaft in the reduction gear, a continuous driving of the reduction gear causes the inner surface of the bearings to be scratched. Thus, the load is gradually increased. If the driving is continued, the bearings will be burnt and thus the machinery becomes unoperatable.

If the load is gradually increased, the electric-power value of the motor does not exceed the upper limit of the relative-value range which is updated at each sampling cycle. When the electric-power value exceeds the upper limit an abnormal signal is output. There is apprehension that the bearings have been burnt at this time and thus the machinery becomes unoperatable. Therefore, development of a load monitoring apparatus capable of quickly producing an output of the abnormal signal has been required.

To meet the above-mentioned requirement, it might be considered feasible to arrange the load monitoring apparatus disclosed in Japanese Patent Laid-Open No. 7-274383 such that the sampling cycle is elongated maximally so as to increase the difference from the previous electric-power value which serves as the reference electric-power value.

However, in a reduction gear having a structure that lubricating oil in a large quantity is circulated in the inside unit thereof, the electric-power value is initially rapidly increased by dint of the starting electric-power value after the motor has been started, and then, the electric-power value is rapidly decreased even if the load is in a normal state. The electric-power value is larger than that in a case where the drive is performed in a state in which the viscosity of the lubricating oil in the reduction gear is stable. In this case, the electric-power value is considerably larger than a predetermined upper limit for the absolute-value range. If the drive is continued, the viscosity of the oil is lowered because the temperature of the lubricating oil in the reduction gear is gradually raised. Therefore, the electric-power value is gradually decreased until it is stabilized.

The electric-power value of the machinery having such reduction gear changes more considerably as compared with the above-mentioned case in which the foreign matter is introduced into the bearings. Therefore, if the sampling cycle is elongated maximally as described above, the conventional load monitoring apparatus cannot respond to the rapid change in the load which occurs in a period from start of the motor to a moment at which the transmission efficiency of the reduction gear is stabilized. Thus, there arises a problem in that an abnormal load exceeding the relative-value range is undesirably detected even if the load is in a normal state.

BRIEF SUMMARY OF THE INVENTION

To solve the above-mentioned problems, an object of the present invention is to provide a load monitoring apparatus arranged to monitor electric-power value which is supplied to a motor in accordance with a predetermined absolute-value range and a relative-value range and elongate the sampling cycle in predetermined steps to correspond to the characteristic of a reduction gear until a stable driving state is obtained so as to be capable of detecting an abnormal load which is gradually increased or decreased in accordance with the relative-value range before the abnormal state exceeds limits of the absolute-value range.

According to one aspect of the present invention, there is provided a load monitoring apparatus arranged to sample a current value and a voltage level of the motor in a machinery which is driven by the motor in response to sampling signals which are time-sequentially generated, calculate electric-power value of the motor in accordance with a result of sampling and compare the calculated electric-power value with an absolute-value and a relative-value range, the relative-value range is determined in accordance with the electric-power value calculated previously to a comparison so as to determine an abnormal load of the motor in accordance with a result of the comparison, comprising a sampling-information memory unit for storing a plurality of sampling cycles and the number of sampling recurrence corresponding to each sampling cycle; and a signal output unit for outputting a sampling signal in accordance with the sampling cycles and the number of sampling recurrence corresponding to each sampling cycle.

In accordance with the sampling cycles corresponding to the characteristic of, for example, a reduction gear until a stable driving state is obtained and the number of sampling recurrence corresponding to each sampling cycle, the electric-power value which is supplied to the motor is sampled and stored time-sequentially. In accordance with the electric-power value, the upper and lower limits for defining the relative-value range are determined. In accordance with upper and lower limits for defining the determined relative-value range, the electric-power value is monitored. Therefore, the load can be monitored with the sampling cycles corresponding to the characteristic of the reduction gear until a stable driving state is obtained, for example, with sampling cycles changed in three steps as to be gradually elongated. Moreover, an abnormal load which is gradually increased or decreased can be detected before the abnormal load exceeds the limits of the absolute-value range.

According to another aspect of the present invention, there is provided a load monitoring apparatus arranged to time-sequentially sample a current value and a voltage level of the motor in a machinery which is driven by the motor, calculate electric-power value of the motor in accordance with a result of sampling, compare the electric-power value calculated by the electric-power calculating unit with an absolute-value range and a relative-value range determined in accordance with the previously sampled reference electric-power value serving as the electric-power value written on the memory unit and write the calculated electric-power value as a reference electric-power value in response to write signals which are time-sequentially generated so as to determine an abnormal load of the motor in accordance with a result of the comparison, comprising a write-information memory unit for storing a plurality of writing cycles and the number of writing recurrence corresponding to each writing cycle; and a signal output unit for time-sequentially outputting write signals in accordance with the plural writing cycles and the number of writing recurrence corresponding to each writing cycle stored in the write-information memory unit.

The electric-power value supplied to the motor is sampled. The sampled electric-power value is time-sequentially written on the memory unit as the reference electric-power value in accordance with the writing cycles corresponding to the characteristic of, for example, the reduction gear until a stable driving is obtained and the number of writing recurrence corresponding to each writing cycle. In accordance with the reference electric-power value, the upper and lower limits for defining the relative-value range are determined. In accordance with the determined upper and lower limits for defining the relative-value range, the electric-power value is monitored. Therefore, an effect similar to that of the above-mentioned load monitoring apparatus can be obtained.

According to another aspect of the present invention, there is provided a load monitoring apparatus arranged to time-sequentially sample a current value and a voltage level of a motor in a machinery which is driven by the motor, calculate electric-power value of the motor in accordance with a result of sampling, compare the calculated electric-power value with an absolute-value range and a relative-value range which is determined by the reference electric-power value which is the electric-power value sampled previously, determine an abnormal load of the motor in accordance with a result of the comparison, comprising: a comparison information memory unit for storing a plurality of comparison cycles and number of comparison recurrence corresponding to each comparison cycle; and a comparison unit for time-sequentially comparing with the plurality of comparison cycles and the number of comparison recurrence corresponding to each comparison cycle stored in the comparison information memory unit.

Since the electric-power value supplied to the motor is time-sequentially sampled, the sampled electric-power value is time-sequentially written as the reference electric-power value. In accordance with the reference electric-power value, the upper and lower limits for defining the relative-value range are determined based on the comparison cycles corresponding to the characteristic of, for example, a reduction gear until a stable driving state is obtained and the number of comparison recurrence corresponding to each comparison cycle. In accordance with the determined upper and lower limits for defining the relative-value range, the electric-power value is monitored. Therefore, an effect similar to that of the above-mentioned load monitoring apparatus can be obtained.

The load monitoring apparatus according to the present invention has the structure that the outputs of the signals from the signal output unit or the comparisons which are performed by the signal output unit or the comparison unit are performed in the plurality of the stored sampling cycles, writing cycles or the comparison cycles in elongating order.

Therefore, an abnormal state of the load in which the load is gradually decreased after start of the loaded drive can be detected in accordance with the relative-value range before the abnormal state exceeds the limits of the absolute-value range.

The load monitoring apparatus according to the present invention has the structure that the plurality of sampling cycles, writing cycles, or comparison cycles of the load monitoring apparatus and the number of sampling recurrence, writing recurrence and comparison recurrence corresponding to each cycles can be input. The input cycles and number of recurrence are stored in the corresponding memory units.

Therefore, the cycles and the number of recurrences stored in the corresponding memory units of the load monitoring apparatus can be changed.

The load monitoring apparatus according to the present invention is arranged to store predetermined time information. After time in accordance with the time information has elapsed from start of the loaded drive of the motor, sampling, writing and comparing are performed as described above.

Therefore, a usual phenomenon that the electric-power value of the motor exceeds the absolute-value range immediately after the loaded drive has been started is not determined as an abnormal load.

The above and further objects and features of the invention will more fully be apparent from the following detailed description with accompanying drawings.

DETAILED DESCRIPTION OF THE INVENTION

Figure 1:
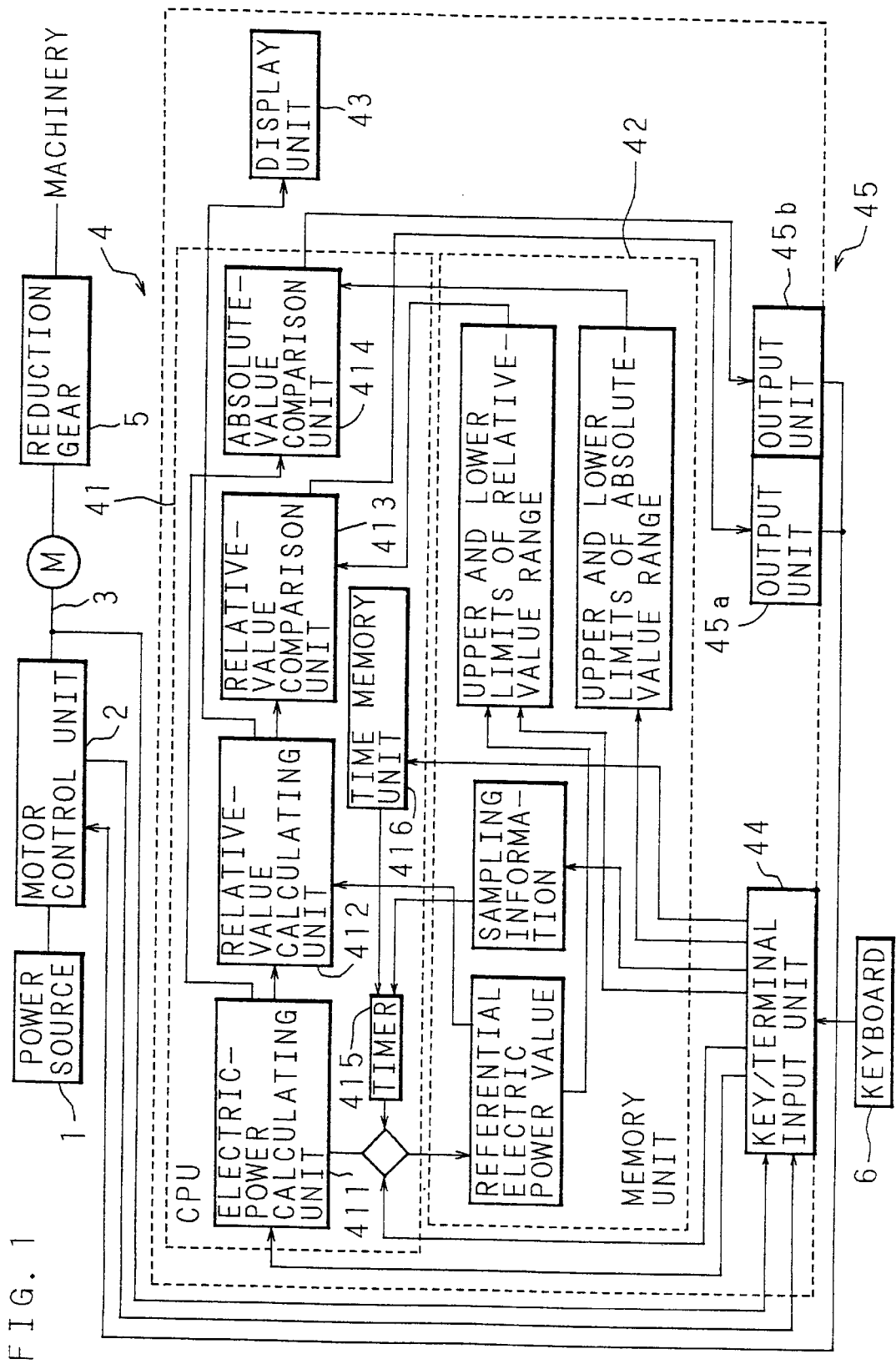
FIG. 1 is a block diagram showing the structure of a load monitoring apparatus according to the present invention.

An embodiment of the present invention will now be described with reference to the drawings. FIG. 1 is a block diagram showing the structure of a load monitoring apparatus according to the present invention.

Referring to FIG. 1, reference numeral 1 represents a power source. Electric-power value for a motor supplied from the power source 1 is adjusted by a motor M control unit 2, the adjusted electric-power value being supplied to the motor M through a power supply line 3. For example, a tool of a machine tool is connected to the motor M through a reduction gear 5. The motor control unit 2 adjusts electric-power value supplied to the motor M and cuts off the supply in accordance with an instruction issued from a load monitoring apparatus 4 if an abnormal load is detected.

The load monitoring apparatus 4 comprises a CPU 41, a memory unit 42, a display unit 43 incorporating a liquid crystal display unit, a key/terminal input unit 44 serving as an input terminal board capable of establishing the communication with outside, and output units 45a, 45b for outputting of a control signal to the motor control unit 2.

An operator operates a keyboard 6 connected to the key/terminal input unit 44 to write, on the memory unit 42, upper and lower limits for defining an absolute-value (with respect to the rated electric-power value of the motor M which is assumed to be 100%) range for the motor M and upper and lower limits for defining a relative-value range.

Moreover, sampling cycles corresponding to three periods of the operation from start of the motor M consisting of period #1, period #2 and period #3 corresponding to the characteristic of the reduction gear 5 which is obtained until the reduction gear 5 is stably driven are stored in the memory unit 42. Also sampling information containing the output recursive number of write signals corresponding to each sampling cycles has been stored in the memory unit 42. A timer 415 outputs the write signal in accordance with the sampling information.

To prevent incorrect determination that the starting electric-power value of the motor M is an abnormal load, an appropriate start time τ has been determined, the start time τ being stored in a time memory unit 416 contained in the CPU 41. After the start time τ stored in the time memory unit 416 has elapsed after start of the motor M, the CPU 41 causes the timer 415 to start an output of the write signal in accordance with the sampling information. The start time τ is set to be the time which is required for the electric-power value to be stable (the electric-power value of the motor M in a loaded driving state) from the start of the motor M after a time period in which the electric-power value is increased immediately after the start. The start time τ is usually determined experimentally.

The timer 415 starts outputting the write signal immediately after the start time τ has been elapsed. In the period #1, the output of the write signals is made, for example, twenty times (for one minute) when the sampling cycle is made to be three seconds to be adaptable to reduction in the electric-power value which takes place when the temperature of the lubricating oil in the reduction gear 5 has been raised. In the period #2, the output of the write signals is made, for example, sixty times (for thirty minutes) when the sampling cycle is made to be thirty seconds to be adaptable to a period of time required for the heating value and the quantity of heat radiation of the reduction gear 5 to achieve the balance. In the period #3, the output of the write signal is made, for example, until the motor M is stopped when the sampling cycle is made to be sixty minutes to be adaptable to change in the electric-power value corresponding to the change in the ambient temperature occurring after the balancing.

The CPU 41 has functions to serve as an electric-power calculating unit 411, a relative-value calculating unit 412, a relative-value comparison unit 413 and an absolute-value comparison unit 414.

The electric-power calculating unit 411 calculates the electric-power value of the motor M in accordance with the current value and the voltage level during the loaded driving of the motor M obtained from the motor control unit 2 and the power supply line 3 through the key/terminal input unit 44. Then, the electric-power calculating unit 411 supplies the calculated electric-power value to the relative-value comparison unit 413 through the relative-value calculating unit 412 and also supplies the same to the absolute-value comparison unit 414.

The relative-value calculating unit 412 extracts a reference electric-power value serving as the electric-power value of the motor M supplied to the memory unit 42 or sampled as described above. In accordance with the reference electric-power value and the electric-power value of the motor M during the loaded driving supplied from the electric-power calculating unit 411, the relative-value calculating unit 412 calculates the amount of change (relative-value) in the electric-power value with respect to the reference electric-power value, and then causes the display unit 43 to display a result of the calculation. Moreover, the relative-value calculating unit 412 supplies the result thereof to the relative-value comparison unit 413. The relative-value comparison unit 413 compare the relative value of the electric-power value supplied from the relative-value calculating unit 412 with the upper and lower limits of the relative-value range extracted from the memory unit 42. If the relative value of the electric-power value is within the relative-value range, the relative-value comparison unit 413 does not output a control signal. If the relative value is not within the relative-value range, the relative-value comparison unit 413 outputs a predetermined control signal to the output unit 45a. When the output unit 45a has been supplied with the control signal, the output unit 45a outputs an abnormal relative-value signal (a signal indicating that the relative value is in an abnormal state) to the motor control unit 2. Thus, the motor control unit 2 is caused to perform control such that power supply to the motor M is cut off (monitoring of the relative value).

The absolute-value comparison unit 414 compare the electric-power value supplied from the electric-power calculating unit 411 with the upper and lower limits of the absolute-value range extracted from the memory unit 42. If the electric-power value is within the absolute-value range, the absolute-value comparison unit 414 does not output a control signal. If the electric-power value is within the absolute-value range, the absolute-value comparison unit 414 outputs a predetermined control signal to another output unit 45b. When the output unit 45b has been supplied with the control signal, the output unit 45b outputs an abnormal absolute-value signal (a signal indicating that the absolute value is in an abnormal state) to the motor control unit 2. Thus, the motor control unit 2 is caused to perform control such that power supply to the motor M is cut off similarly to the abnormal relative-value signal (monitoring of the absolute value).

Figure 2:
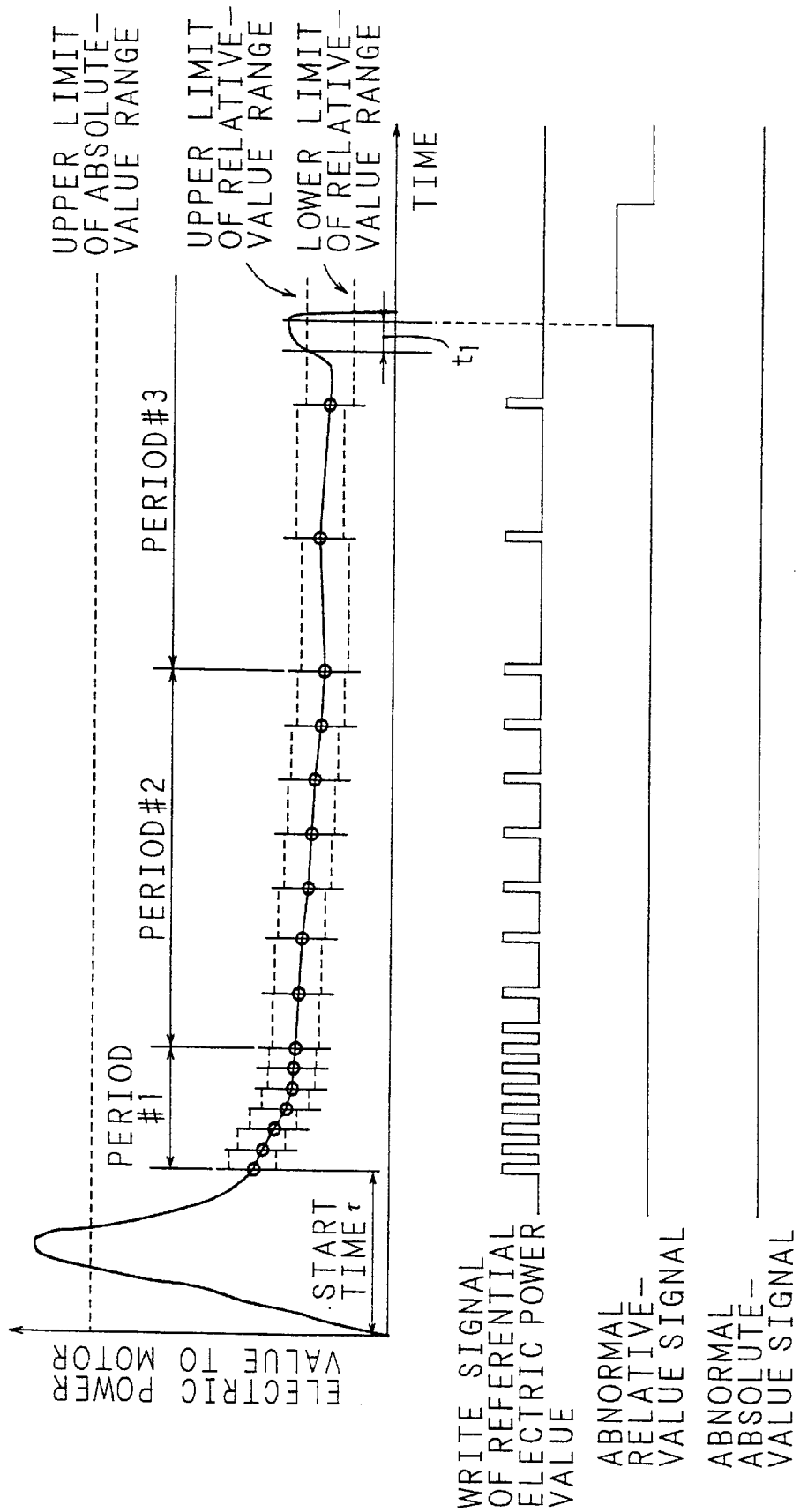
FIG. 2 is a graph showing change in a relative-value range of electric-power value of the motor of the load monitoring apparatus according to the present invention and a timing chart showing the relationship among a write signal corresponding to the change, a write signal of reference electric-power value and a signal indicating that the relative value is in an abnormal state.
Figure 3:
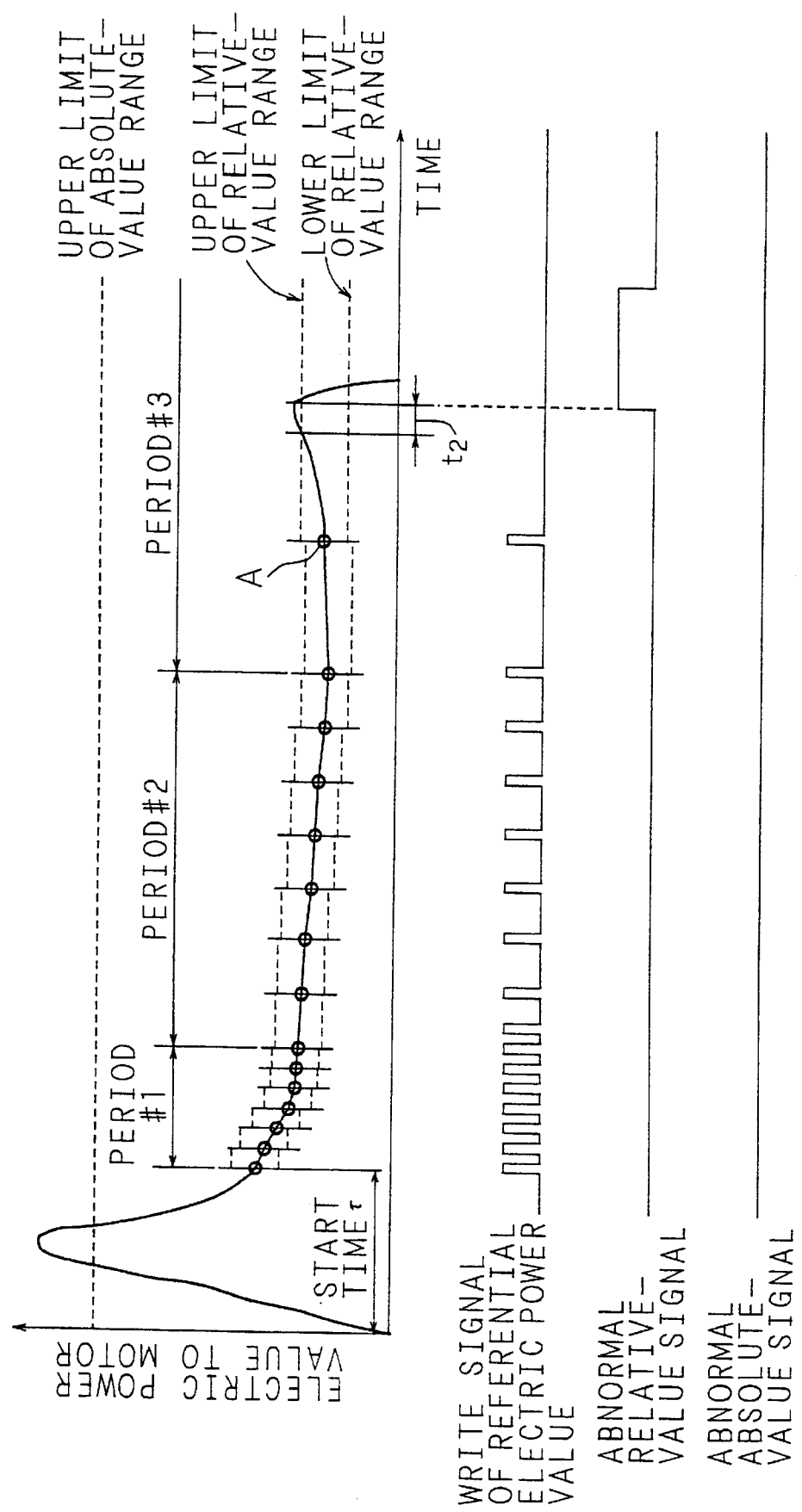
FIG. 3 is a graph showing change in a relative-value range of electric-power value of the motor of the load monitoring apparatus according to the present invention and a timing chart showing the relationship among the write signal corresponding to the change, the write signal of reference electric-power value and the signal indicating that the relative value is in an abnormal state.

FIGS. 2 and 3 are graphs showing change in the electric-power value and timing charts showing the relationship among the write signal corresponding to the change, a write signal of the reference electric-power value and an abnormal relative-value signal. FIG. 2 shows a state in which the load is rapidly increased, for example, a state in which a cargo has been caught on a conveyor of a carrying apparatus or a state in which a pulley belt of a power transmission mechanism has been torn off. FIG. 3 shows a state in which the load is gradually increased, for example, because foreign matter has been introduced into the bearings.

Referring to FIGS. 2 and 3, in the start time τ immediately after the motor M has been started, the electric-power value is rapidly increased, and then the same is rapidly decreased. If the load is in a normal state, a predetermined electric-power value of the motor M is substantially obtained and shifted around at a moment at which the start time τ has been elapsed. Therefore, the write signal (the write signal of the reference electric-power value) is supplied immediately after the time corresponding to the predetermined start time τ stored in the time memory unit 416 has elapsed. Thus, the electric-power value at the above-mentioned time is written on the memory unit 42 as the reference electric-power value.

The input of the signal may be performed by a structure in which the write signal is supplied from outside through the key/terminal input unit 44. For example, a structure may be employed in which a keyboard 6 is connected to cause an operator to perform manual input. Another structure may be employed in which a detection signal output from an ammeter or the like (not shown) connected to the motor M is supplied as the write signal.

When the reference electric-power value has been written on the memory unit 42, the relative-value calculating unit 412 extracts the reference electric-power value from the memory unit 42. Then, the relative-value calculating unit 412 calculates electric-power value with respect to the reference electric-power value, after which the relative-value calculating unit 412 communicates the electric-power value of the motor M with respect to the reference electric-power value to the relative-value comparison unit 413. Thus, a comparison with the upper and lower limits of the relative-value range is performed so that the relative value is monitored.

If the load is rapidly increased as shown in FIG. 2, the electric-power value with respect to the reference electric-power value exceeds the upper limit for predetermined time $t_1$. Therefore, the abnormal signal is output from the relative-value comparison unit 413 to the motor control unit 2 through the output unit 45a. In response to the supplied abnormal relative-value signal, the motor control unit 2 cuts off the power supply to the motor M.

The absolute-value comparison unit 414 compare the upper and lower limits of the absolute-value range extracted from the memory unit 42 with the electric-power value supplied from the electric-power calculating unit 411. Thus, the absolute value is monitored in accordance with the upper and lower limits of the absolute-value range.

If foreign matter is introduced into the bearings especially during the period #3 in which a long sampling cycle is provided and thus the load is gradually increased as shown in FIG. 3, an electric-power value A is written as the reference electric-power value. Then, the upper limit of the relative-value range which is thus determined is not rewritten for 30 minutes for example. Therefore, if the electric-power value is gradually increased, the absolute-value comparison unit 414 outputs the abnormal absolute-value signal to the motor control unit 2 through the output unit 45a because the electric-power value exceeds the upper limit of the relative-value range for predetermined time $t_2$ which is determined when the electric-power value A has been written. In accordance with the supplied abnormal absolute-value signal the motor control unit 2 immediately cuts off the power supply to the motor M. Therefore, danger can be prevented.

Figure 4:
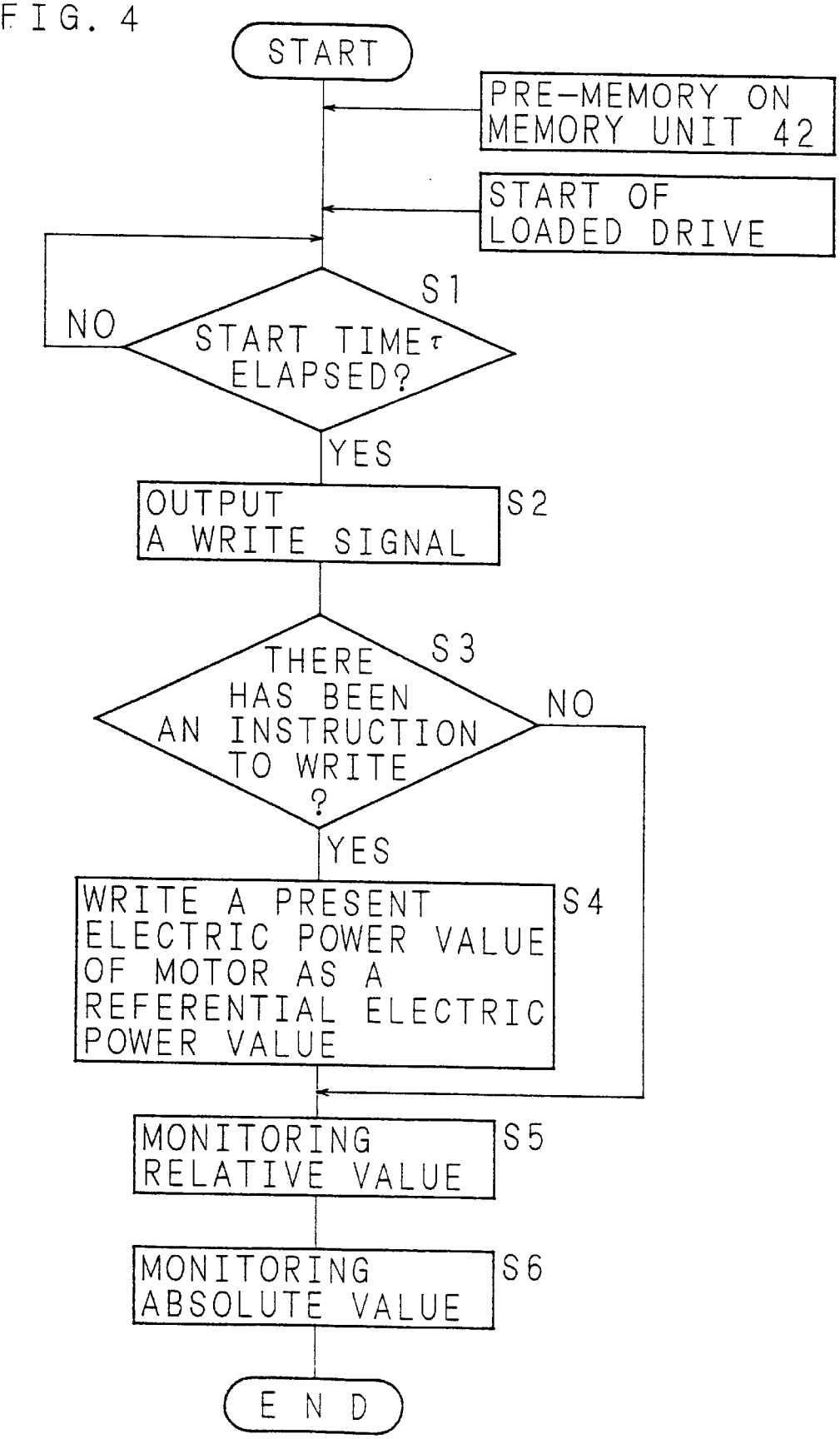
FIG. 4 is a flow chart of control which is performed by a CPU 41 of the load monitoring apparatus according to the present invention.

FIG. 4 is a flow chart showing the contents of the control which is performed by the CPU 41 in order to monitor the load. Initially, the operator initially writes, on the memory unit 42 through the keyboard 6 connected to the key/terminal input unit 44, the upper and lower limits of the relative-value range and the upper and lower limits of the absolute-value range.

Then, the CPU 41 determines whether or not the start time τ has elapsed from the start of the loaded driving of the motor M (step 1). If time does not elapse the start time τ, the operation returns to the step 1. If time elapses the start time τ, the timer 415 is operated. The timer 415 outputs a write signal in accordance with sampling information stored in the memory unit 42 (step 2).

Whether or not the instruction to write, on the memory unit 42, the electric-power value calculated by the electric-power calculating unit 411 as the reference electric-power value has been issued is determined (step 3). If the instruction to write the reference electric-power value is issued, the present electric-power value calculated by the electric-power calculating unit 411 is written on the memory unit 42 as the reference electric-power value (step 4). If no write instruction is issued in step 3, or after step 4 has been completed, the operations for monitoring the relative value and the absolute value are simultaneously performed as described above (steps 5 and 6).

Since the structure is formed as described above, the load can be monitored at sampling cycles corresponding to the characteristic of the reduction gear 5 until the stable driving state is obtained. Therefore, the load of the motor M corresponding to the change in the transmission efficiency of the reduction gear 5 before the stable driving is obtained can be detected. Even if the load is gradually increased as if foreign matter is introduced into the bearings, the longest sampling cycle can be determined within the range of the sampling cycles corresponding to the characteristic of the reduction gear 5 as described above. Therefore, an abnormal state of the load can be detected before the machinery including the motor M and the reduction gear 5 is brought to a dangerous state.

The above-mentioned embodiment has the structure that sampling information is stored in the memory unit 42 and sampling of the current value and the voltage level of the motor M is performed in accordance with sampling information. Another structure may be employed in which a plurality of writing cycles for writing the reference electric-power value in the memory unit 42 and the number of writing recurrence corresponding to each writing cycle are stored. As an alternative to this, a structure may be employed in which a plurality of comparative cycles for subjecting the relative-value range and the calculated electric-power value and the number of comparison recurrence corresponding to each comparative cycle are stored in the memory unit 42 so as to cause the writing or comparison operation to be performed to correspond to each cycle and the number of the recurrence. As a matter of course, an effect similar to that obtainable from the structure using sampling information can be obtained.

Although the foregoing embodiment has the structure that the sampling cycles and the writing cycles of the reference electric-power value are synchronized with each other, the structure is not limited to this. The requirement for the present invention lies in that outputting a result of the comparison can be produced at timing corresponding to a plurality of predetermined cycles and number of recurrence. A structure may be employed in which the electric-power value is sampled at predetermined cycles so as to be stored in the memory unit 42. Moreover, the electric-power value stored in the memory unit 42 is used as a reference electric-power value when a writing operation is performed to correspond to the plurality of the writing cycles and the number of writing recurrence which have previously been set in the memory unit 42.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A load monitoring apparatus, comprising:
    a sampling-information memory unit for storing a plurality of sampling cycles and the number of sampling recurrence corresponding to each sampling cycle;
    a signal output unit for outputting a sampling signal in accordance with the plurality of the sampling cycles and the number of sampling recurrence corresponding to each sampling cycle stored in said sampling-information memory unit;
    a sampling unit for sampling a current value and a voltage level of a motor for driving a machinery in response to the sampling signal time-sequentially output from said signal output Unit;
    an electric-power calculating unit for calculating electric-power value of the motor in accordance with a result of the sampling performed by said sampling unit;
    a comparison unit for comparing the electric-power value of the motor calculated by said electric-power calculating unit with an absolute-value range and a relative-value range which is determined in accordance with a previously calculated electric-power value of the motor; and
    a determination unit for determining an abnormal load of the motor in accordance with a result of the comparison performed by said comparison unit.

2. The load monitoring apparatus according to claim 1, wherein said signal output unit is arranged to output the sampling signals with the sampling cycles stored in said sampling-information memory unit in order of elongating the cycles.

3. The load monitoring apparatus according to claim 1, further comprising:
    an input unit for inputting the plural sampling cycles and the number of sampling recurrence corresponding to each sampling cycle.

4. The load monitoring apparatus according to claim 1, further comprising:
    an input unit for inputting the plural sampling cycles and the number of sampling recurrence corresponding to each sampling cycle, wherein a result of the input performed through said input unit is stored in said sampling-information memory unit.

5. The load monitoring apparatus according to claim 1, further comprising:
    a time memory unit for storing predetermined time information, wherein said signal output unit is arranged to start outputting the sampling signal after time which is determined in accordance with the predetermined time information stored in said time memory unit has elapsed from start of a loaded driving of the motor.

6. The load monitoring apparatus according to claim 1, further comprising:
    a time memory unit for storing time information for delaying start of sampling, wherein said signal output unit is arranged to start outputting the sampling signal after time which is determined in accordance with the time information stored in said time memory unit has elapsed from start of a loaded driving of the motor.

7. A load monitoring apparatus, comprising:
    a write-information memory unit for storing a plurality of writing cycles and the number of writing recurrences corresponding to each writing cycle;
    a signal output unit for time-sequentially outputting write signals in accordance with the plural writing cycles and the number of writing recurrence corresponding to each writing cycle stored in said write-information memory unit;
    a sampling unit for time-sequentially sampling a current value and a voltage level of the motor for driving a machinery;
    an electric-power calculating unit for calculating electric-power value of the motor in accordance with a result of the sampling performed by said sampling unit;
    a comparison unit for comparing the electric-power value of the motor calculated by said electric-power calculating unit with an absolute-value range and a relative-value range which is determined in accordance with the reference electric-power value serving as the electric-power value of the motor sampled previously and written on said memory unit;
    a determination unit for determining an abnormal load of the motor in accordance with a result of the comparison performed by said comparison unit; and
    a writing unit for writing the calculated electric-power value of the motor as the reference electric-power value in said memory unit in response to the write signal output from said signal output unit.

8. The load monitoring apparatus according to claim 7, wherein said signal output unit is arranged to output the sampling signals with the plural writing cycles in order of elongating the cycles.

9. The load monitoring apparatus according to claim 7, further comprising:
    an input unit for inputting the plural writing cycles and the number of writing recurrence corresponding to each writing cycle.

10. The load monitoring apparatus according to claim 7, further comprising:
    an input unit for inputting the plural writing cycles and the number of writing recurrence corresponding to each writing cycle wherein a result of the input performed through said input unit is stored in said write-information memory unit.

11. The load monitoring apparatus according to claim 7, further comprising:

a time memory unit for storing predetermined time information, wherein said signal output unit is arranged to start outputting the write signal after time which is determined in accordance with the predetermined time information stored in said time memory unit has elapsed from start of a loaded driving of the motor.

12. The load monitoring apparatus according to claim 7, further comprising:

a time memory unit for storing time information for delaying start of writing, wherein said signal output unit is arranged to start outputting the write signal after time determined in accordance with the time information stored in said time memory unit has elapsed from start of a loaded driving of the motor.

13. A load monitoring apparatus, comprising:

a comparison information memory unit for storing a plurality of comparison cycles and the number of comparison recurrence corresponding to each comparison cycle;

a comparison unit for time-sequentially comparing the plurality of comparison cycles and the number of comparison recurrence corresponding to each comparison cycle stored in said comparison information memory unit;

a sampling unit for time-sequentially sampling a current value and a voltage level of the motor for driving a machinery;

an electric-power calculating unit for calculating electric-power value of the motor in accordance with a result of the sampling performed by said sampling unit;

a comparison unit for comparing the electric-power value of the motor calculated by said electric-power calculating unit with an absolute-value range and a relative-value range which is determined in accordance with reference electric-power value which is the previously sampled electric-power value of the motor; and a determination unit for determining an abnormal load of the motor in accordance with a result of the comparison performed by said comparison unit.

14. The load monitoring apparatus according to claim 13, wherein said comparison unit is arranged to perform comparison with the plural comparison frequencies in order of elongating the comparison cycles.

15. The load monitoring apparatus according to claim 13, further comprising:

an input unit for inputting the plural comparison cycles and the number of comparison recurrence corresponding to each comparison cycle.

16. A load monitoring apparatus according to claim 13, further comprising:

an input unit for inputting the plural comparison cycles and the number of comparison recurrence corresponding to the comparison cycle, wherein a result of the input performed through said input unit is stored in said comparison-information memory unit.

17. The load monitoring apparatus according to claim 13, further comprising:

a time memory unit for storing predetermined time information, wherein said comparison unit is arranged to start the comparison after time determined in accordance with the predetermined time information stored in said time memory unit has elapsed from start of a loaded driving of the motor.

18. The load monitoring apparatus according to claim 13, further comprising:

a time memory unit for storing time information for delaying start of the comparison, wherein said comparison unit is arranged to start the operation after time determined in accordance with the time information stored in said time memory unit has elapsed from start of a loaded driving of the motor.

\* \* \* \* \*